(12) United States Patent
Takada

(10) Patent No.: US 12,438,760 B2
(45) Date of Patent: *Oct. 7, 2025

(54) COMMUNICATION APPARATUS, INFORMATION PROCESSING APPARATUS, CONTROL METHOD, AND STORAGE MEDIUM

(71) Applicant: CANON KABUSHIKI KAISHA, Tokyo (JP)

(72) Inventor: Tomoyuki Takada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

This patent is subject to a terminal disclaimer.

(21) Appl. No.: 18/340,559

(22) Filed: Jun. 23, 2023

(65) Prior Publication Data
US 2023/0336392 A1 Oct. 19, 2023

Related U.S. Application Data

(63) Continuation of application No. 16/908,088, filed on Jun. 22, 2020, now Pat. No. 11,729,035.

(30) Foreign Application Priority Data

Jun. 28, 2019 (JP) .................. 2019-121663

(51) Int. Cl.
*H04L 27/26* (2006.01)
*H04L 1/00* (2006.01)
*H04L 5/00* (2006.01)
*H04L 27/20* (2006.01)
*H04W 84/12* (2009.01)
*H04W 88/10* (2009.01)

(52) U.S. Cl.
CPC ........ *H04L 27/2613* (2013.01); *H04L 1/0006* (2013.01); *H04L 5/0007* (2013.01); *H04L 27/2085* (2013.01); *H04L 27/2602* (2013.01); *H04W 84/12* (2013.01); *H04W 88/10* (2013.01); *H04L 27/26136* (2021.01)

(58) Field of Classification Search
None
See application file for complete search history.

(56) References Cited

U.S. PATENT DOCUMENTS

| | | | |
|---|---|---|---|
| 10,476,633 B2* | 11/2019 | Robert Safavi | H04L 1/0048 |
| 2019/0182095 A1* | 6/2019 | Suh | H04L 1/0058 |
| 2020/0136884 A1* | 4/2020 | Park | H04L 27/2602 |
| 2020/0220644 A1* | 7/2020 | Aboul-Magd | H04B 17/336 |

* cited by examiner

Primary Examiner — Luna Weissberger
(74) Attorney, Agent, or Firm — Canon U.S.A., Inc. IP Division

(57) ABSTRACT

A communication apparatus transmits or receives an Extremely High Throughput (EHT) single-user (SU) physical-layer protocol data unit (PPDU), an EHT extended range (ER) SU PPDU, or an EHT multi-user (MU) PPDU. The transmitted or received EHT PPDU includes an EHT signal field (EHT-SIG) which includes a field indicating information regarding semi-orthogonal multiple access (SOMA).

9 Claims, 7 Drawing Sheets

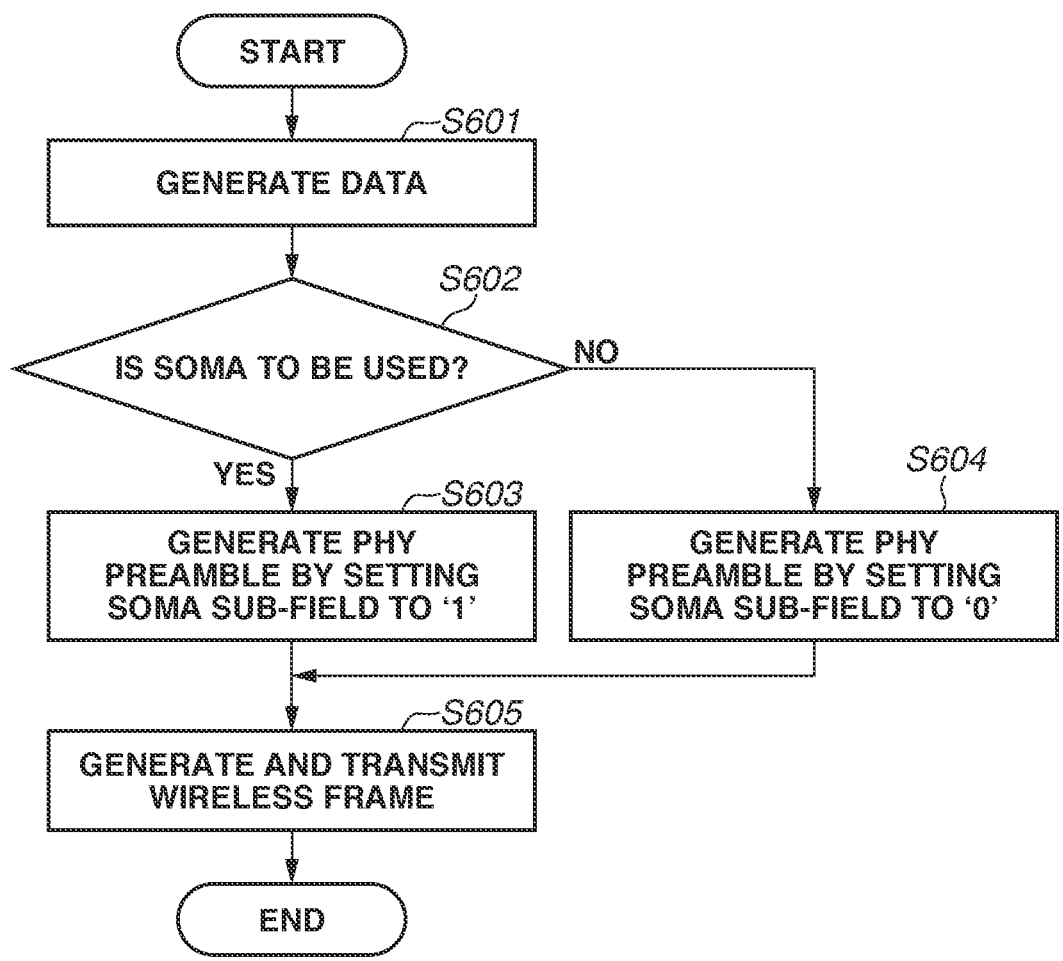

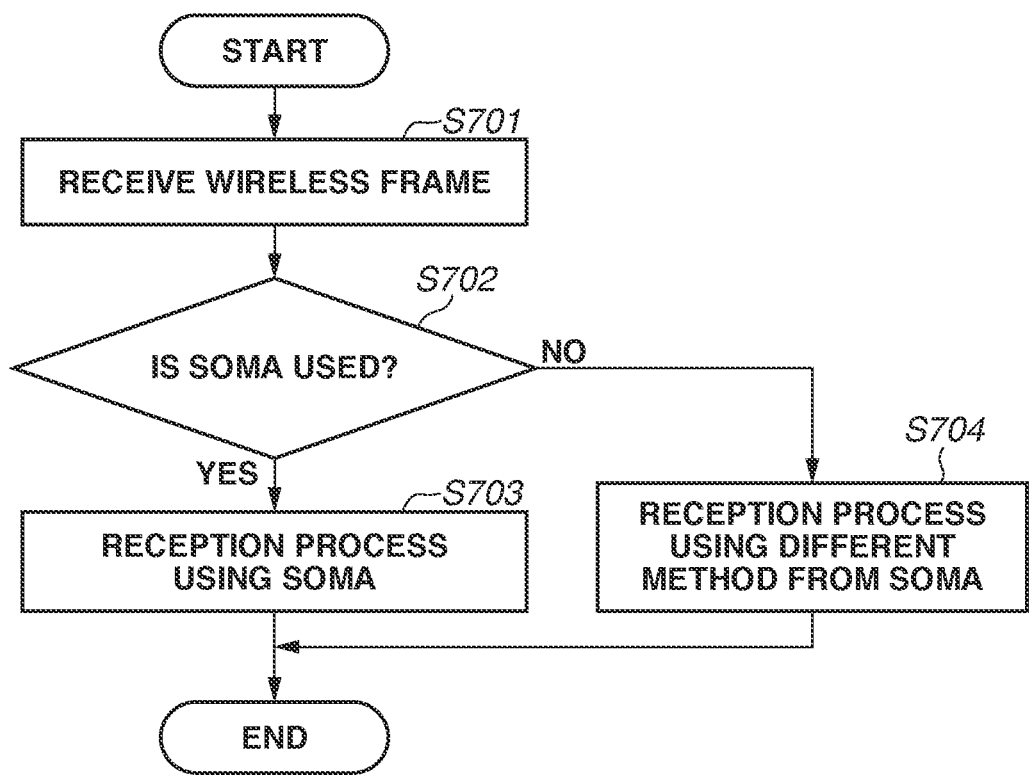

COMMUNICATION APPARATUS, INFORMATION PROCESSING APPARATUS, CONTROL METHOD, AND STORAGE MEDIUM

CROSS-REFERENCE TO RELATED APPLICATIONS

This application is a Continuation of co-pending U.S. patent application Ser. No. 16/908,088 filed Jun. 22, 2020, which claims priority benefit of Japanese Application No. 2019-121663 filed Jun. 28, 2019. The disclosures of the above-named applications are hereby incorporated by reference herein in their entireties.

BACKGROUND

Field

The present disclosure relates to an apparatus for communicating data through wireless communication.

Description of the Related Art

As a wireless local area network (WLAN) standard formulated by the Institute of Electrical and Electronics Engineers (IEEE), there is the IEEE 802.11 standard series.

US Patent Publication Application No. US2018/0084584 discusses a technique for executing wireless communication using orthogonal frequency-division multiple access (OFDMA) in the IEEE 802.11ax standard. In the IEEE 802.11ax standard, high peak throughput is achieved by executing wireless communication using OFDMA.

An Extremely High Throughput (EHT) study group of the IEEE is formulating the IEEE 802.11be standard, which is a next-generation WLAN communication standard. The IEEE 802.11be standard considers the introduction of a new multiple access method to improve the throughput.

The IEEE 802.11be standard considers the introduction of semi-orthogonal multiple access (SOMA). A communication apparatus that transmits data to a plurality of other communication apparatuses can multiplex the data to be transmitted to the plurality of other communication apparatuses using SOMA and simultaneously transmit the multiplexed data. In the conventional IEEE 802.11 series standards, however, SOMA has not been used, and therefore, information regarding SOMA cannot be communicated to apparatuses using the conventional IEEE 802.11 series standards. Thus, a communication apparatus that receives data multiplexed using SOMA cannot acquire information regarding SOMA and therefore cannot acquire the received data multiplexed using SOMA, where the communication apparatus is using a conventional IEEE 802.11 series standard.

SUMMARY

The present disclosure is directed to a technique in which a transmitting communication apparatus that communicates using semi-orthogonal multiple access (SOMA) communicates information regarding SOMA, whereby a receiving communication apparatus that receives a signal in which SOMA is used can acquire the received data which has been multiplexed using SOMA.

According to one embodiment of the present disclosure, a communication apparatus includes a generation unit configured to generate an Extremely High Throughput (EHT) physical-layer protocol data unit (PPDU), wherein the generated EHT PPDU is one of an EHT single-user (SU) PPDU, an EHT extended range (ER) SU PPDU, or an EHT multi-user (MU) PPDU, and a transmission unit configured to transmit the EHT PPDU generated by the generation unit. The generated EHT PPDU includes a legacy short training field (L-STF), a legacy long training field (L-LTF) configured to be communicated after the L-STF, a legacy signal field (L-SIG) configured to be communicated after the L-LTF, an EHT signal field (EHT-SIG) configured to be communicated after the L-SIG and including a field indicating information regarding semi-orthogonal multiple access (SOMA), an EHT short training field (EHT-STF) configured to be communicated after the EHT-SIG, and an EHT long training field (EHT-LTF) configured to be communicated after the EHT-STF.

According to another embodiment of the present disclosure, a communication apparatus includes a reception unit configured to receive an Extremely High Throughput (EHT) physical-layer protocol data unit (PPDU), wherein the received EHT PPDU is one of an EHT single-user (SU) PPDU, an EHT extended range (ER) SU PPDU, or an EHT multi-user (MU) PPDU, and a communication unit configured to execute communication based on information regarding semi-orthogonal multiple access (SOMA) received by the reception unit. The received EHT PPDU includes a legacy short training field (L-STF), a legacy long training field (L-LTF) configured to be communicated after the L-STF, a legacy signal field (L-SIG) configured to be communicated after the L-LTF, an EHT signal field (EHT-SIG) configured to be communicated after the L-SIG and including a field indicating information regarding SOMA, an EHT short training field (EHT-STF) configured to be communicated after the EHT-SIG, and an EHT long training field (EHT-LTF) configured to be communicated after the EHT-STF.

Further features will become apparent from the following description of exemplary embodiments with reference to the attached drawings.

BRIEF DESCRIPTION OF THE DRAWINGS

FIG. 6 is a flowchart illustrating processing executed when a communication apparatus transmits a PPDU according to one embodiment.

FIG. 7 is a flowchart illustrating processing executed when a communication apparatus receives the PPDU according to one embodiment.

DESCRIPTION OF THE EMBODIMENTS

Exemplary embodiments will be described in detail below with reference to the attached drawings. The configurations illustrated in the following exemplary embodiments are merely examples, and the present disclosure is not limited to the illustrated configurations.

Figure 1:
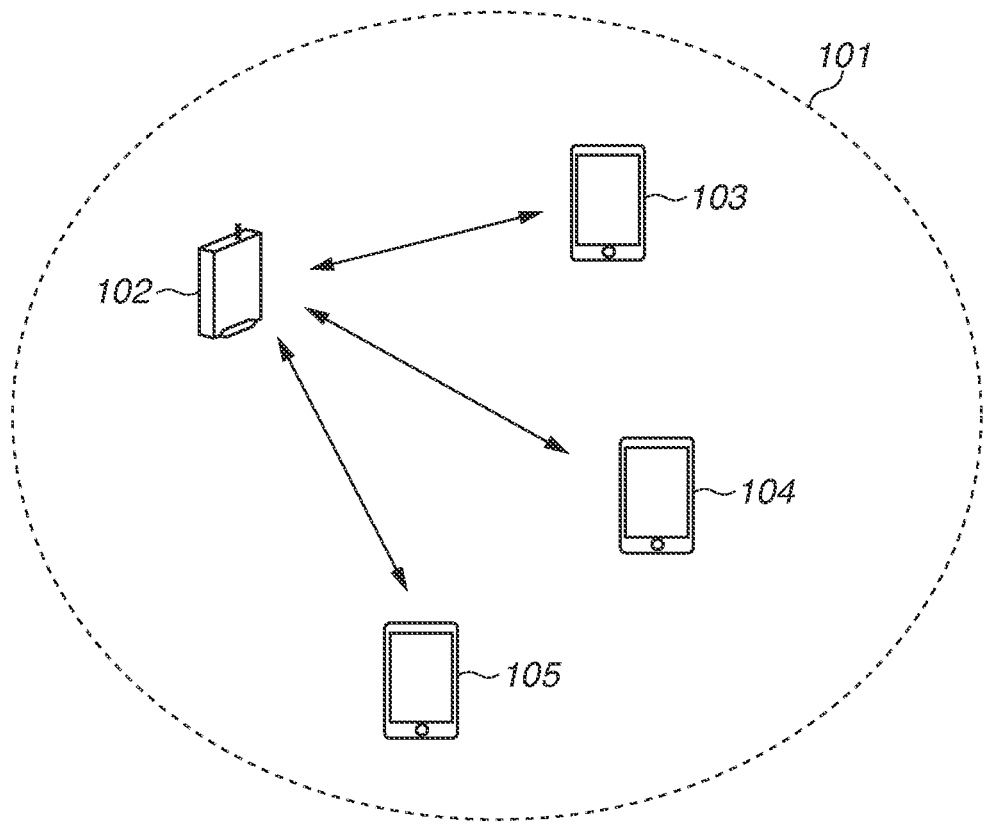
FIG. 1 is a diagram illustrating a configuration of a network that a communication apparatus joins in according to one embodiment.

FIG. 1 illustrates the configuration of a network 101 that a communication apparatus 102 joins in. Communication apparatuses 103 to 105 are stations (STAs) having functions of joining in the network 101. The communication apparatus 102 is an access point (an AP) having a function of constructing the network 101. Each communication apparatus is compatible with the Institute of Electrical and Electronics Engineers (IEEE) 802.11be standard being formulated by an Extremely High Throughput (EHT) study group and can execute wireless communication compliant with the IEEE 802.11be standard via the network 101. Each communication apparatus can communicate in the 2.4 GHz, 5 GHz, and 6 GHz frequency bands. Each communication apparatus can communicate using 20 MHz, 40 MHz, 80 MHz, 160 MHz, and 320 MHz bandwidths.

In the present exemplary embodiment, semi-orthogonal multiple access (SOMA) can be used to transmit and receive data between the AP 102 and the STAs 103 to 105. In communication using SOMA, a plurality of independent signals appropriately allocated different power levels is transmitted in parallel at the same time using a common frequency channel. These signals are not orthogonal to each other. If communication is carried out using SOMA, a plurality of signals can be simultaneously transmitted using a common frequency channel. Thus, a wireless resource can be utilized in an effective way, and the throughput of the entirety of the system can be improved.

A communication apparatus that receives a signal with larger transmission power among signals transmitted using SOMA can process, as noise, signals with smaller transmission power transmitted to other communication apparatuses and therefore can receive data similarly to a normal reception process. On the other hand, a communication apparatus that receives a signal with the smaller transmission power among signals transmitted using SOMA performs a combined constellation process and thereby can acquire data addressed to the communication apparatus. The combined constellation process will be described in detail with reference to table 5.

As a technique for multiplexing a plurality of non-orthogonal signals and transmitting the multiplexed signals, there is a technique termed non-orthogonal multiple access (NOMA). Also in NOMA, similarly to SOMA, a communication apparatus that receives a signal with larger transmission power can process, as noise, signals with smaller transmission power transmitted to other communication apparatuses and therefore can receive data similarly to a normal reception process. On the other hand, a communication apparatus that receives a signal with smaller transmission power executes a process termed Successive Interference Cancellation (SIC), thereby extracting data addressed to the communication apparatus. The communication apparatus that executes the SIC process regards signals including both a signal addressed to itself and signals addressed to other communication apparatuses as signals addressed to the other communication apparatuses (i.e., regards the signal addressed to itself as noise) and demodulates the signals. Then, the communication apparatus excludes the signals addressed to the other communication apparatuses from the signals including both the signal addressed to itself and the signals addressed to the other communication apparatuses and thereby can acquire the data addressed to itself. In NOMA, unlike SOMA, a communication apparatus that receives a signal with smaller transmission power needs to demodulate also signals addressed to other communication apparatuses. Thus, the process is cumbersome.

In the above description, the communication apparatuses 102 to 105 are compatible with the IEEE 802.11be standard. In addition to the IEEE 802.11be standard, the communication apparatuses 102 to 105 may also be compatible with a legacy standard that is a standard before the IEEE 802.11be standard. Specifically, the communication apparatuses 102 to 105 may be compatible with at least any one of the IEEE 802.11a/b/g/n/ac/ax standards. In addition to the IEEE 802.11 series standards, the communication apparatuses 102 to 105 may also be compatible with other communication standards such as Bluetooth (registered trademark), near-field communication (NFC), ultra-wideband (UWB), ZigBee, or MultiBand OFDM Alliance (MBOA). UWB includes Wireless Universal Serial Bus (USB), Wireless 1394, and WiNET. In addition to the IEEE 802.11 series standards, the communication apparatuses 102 to 105 may also be compatible with standards such as the Wi-Fi Direct standard formulated by the Wi-Fi Alliance. The communication apparatuses 102 to 105 may also be compatible with a wired communication standard for a wired local area network (LAN).

Specific examples of the communication apparatus 102 include a wireless LAN router and a personal computer (PC). The present disclosure, however, is not limited to these examples. Specific examples of the communication apparatuses 103 to 105 include a camera, a tablet, a smartphone, a PC, a mobile phone, and a video camera. The present disclosure, however, is not limited to these examples.

Although FIG. 1 illustrates a network including a single AP and three STAs as an example, the numbers of APs and STAs are not limited to these numbers. In a case where STAs perform communication with each other by similarly using SOMA, an AP does not need to exist in the network. For example, in a case where the communication apparatuses 103 to 105 are compliant with the Wi-Fi Direct standard, any one of the communication apparatuses 103 to 105 may operate as a group owner compliant with the Wi-Fi Direct standard. Among the communication apparatuses 103 to 105, the remaining communication apparatuses that are not the group owner can operate as clients compliant with the Wi-Fi Direct standard, whereby the communication apparatuses 103 to 105 can achieve communication without an AP.

Figure 2:
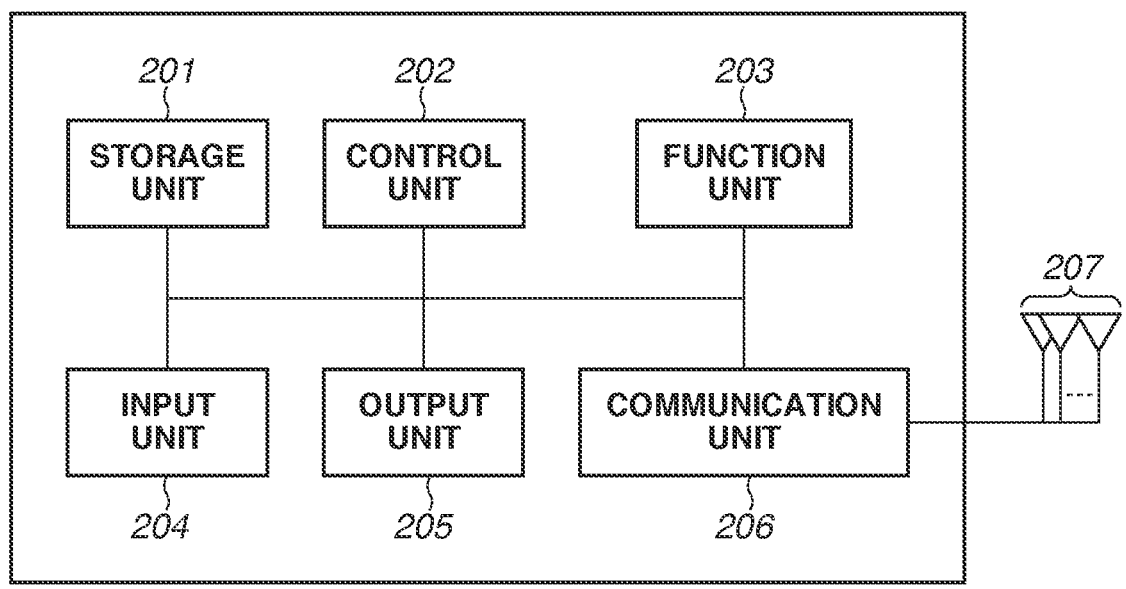
FIG. 2 is a diagram illustrating a hardware configuration of a communication apparatus according to one embodiment.

FIG. 2 illustrates a hardware configuration of the communication apparatus 102 according to the present disclosure. The communication apparatus 102 includes a storage unit 201, a control unit 202, a function unit 203, an input unit 204, an output unit 205, a communication unit 206, and an antenna 207.

The storage unit 201 includes one or more memories such as a read-only memory (ROM) and a random-access memory (RAM) and stores computer programs for performing various operations described below, and various types of information such as communication parameters for wireless communication. As the storage unit 201, as well as the memories such as the ROM and the RAM, a storage medium such as a flexible disk, a hard disk, an optical disc, a magneto-optical disc, a Compact Disc Read-Only Memory (CD-ROM), a Compact Disc Recordable (CD-R), a magnetic tape, a non-volatile memory card, or a digital versatile disc (DVD) may be used.

The control unit 202 includes one or more processors such as a central processing unit (CPU) and a microprocessor unit (MPU) and controls the entirety of the communication apparatus 102 by executing a computer program stored in the storage unit 201. The control unit 202 may include an application-specific integrated circuit (ASIC), a digital signal processor (DSP), or a field-programmable gate array (FPGA) in addition to or instead of the CPU or the MPU. The control unit 202 may control the entirety of the communication apparatus 102 by the cooperation between a computer program stored in the storage unit 201 and an operating system (OS). The control unit 202 generates data and a signal to be transmitted in communication with another communication apparatus. Alternatively, the control unit 202 may include a plurality of processors such as multi-core processors and control the entirety of the communication apparatus 102 using the plurality of processors.

The control unit 202 controls the function unit 203 to execute a predetermined process such as capturing of an image, printing, or projection. The function unit 203 is hardware for the apparatus to execute the predetermined process.

The input unit 204 receives various operations from a user. The output unit 205 provides various outputs to the user. In this regard, an output provided by the output unit 205 may be at least one of, for example, display on a screen, the output of a sound from a loudspeaker, and vibration output. Both the input unit 204 and the output unit 205 may be realized by a single module such as a touch panel. Each of the input unit 204 and the output unit 205 may be integrated with or separate from the communication apparatus 103.

The communication unit 206 controls wireless communication compliant with the IEEE 802.11be standard. In addition to the IEEE 802.11be standard, the communication unit 206 may also control wireless communication compliant with other IEEE 802.11 series standards, or control wired communication via a wired LAN. The communication unit 206 is a wireless chip and may itself include one or more processors or memories as an information processing apparatus. The communication unit 206 controls the antenna 207 to transmit and receive a wireless signal for wireless communication generated by the control unit 202. The communication apparatus 102 communicates with another communication apparatus via the communication unit 206 to receive and transmit a content such as image data, document data, or video data therebetween.

The antenna 207 is an antenna capable of transmitting and receiving a signal by using at least any of, for example, the 2.4 GHz, 5 GHz, and 6 GHz frequency bands. The frequency bands (and the combinations of the frequency bands) with which the antenna 207 is compatible are not limited to any particular frequency. The antenna 207 may be a single antenna, or may include two or more antennas to transmit and receive data when multiple-input and multiple-output (MIMO) communication is performed. In a case where the MIMO communication is executed, the communication apparatus 102 assigns the plurality of antennas to respective partner apparatuses or antennas included in the partner apparatuses and simultaneously transmits radio waves from the antennas, and thereby can realize simultaneous communication with the plurality of partner apparatuses or antennas. Alternatively, the antenna 207 may include, for example, two or more antennas compatible with communication in different frequency bands. The antenna 207 and the communication unit 206 may be configured as separate components, or may be configured as a unit of a single module.

The communication apparatuses 103 to 105 also have hardware configurations similar to that of the communication apparatus 102.

Figure 3:
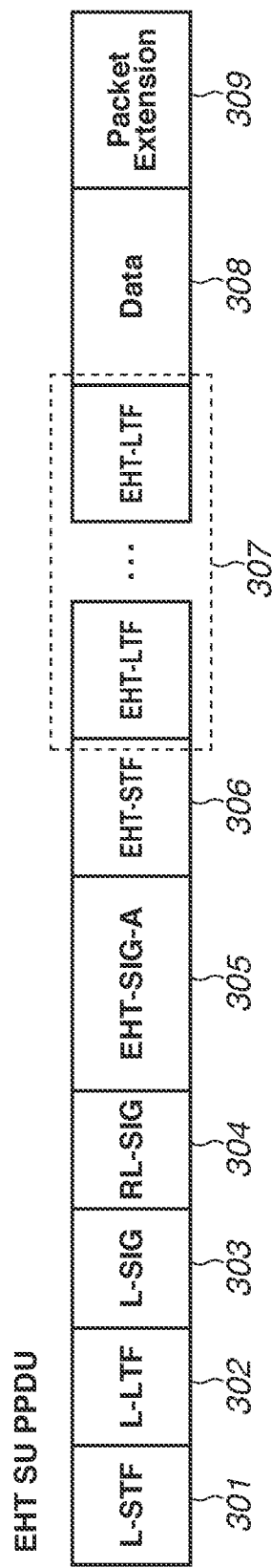
FIG. 3 is a diagram illustrating an example of a physical layer (PHY) frame configuration of an Extremely High Throughput (EHT) single-user (SU) physical-layer protocol data unit (PPDU) transmitted from or received by a communication apparatus according to one embodiment.
Figure 4:
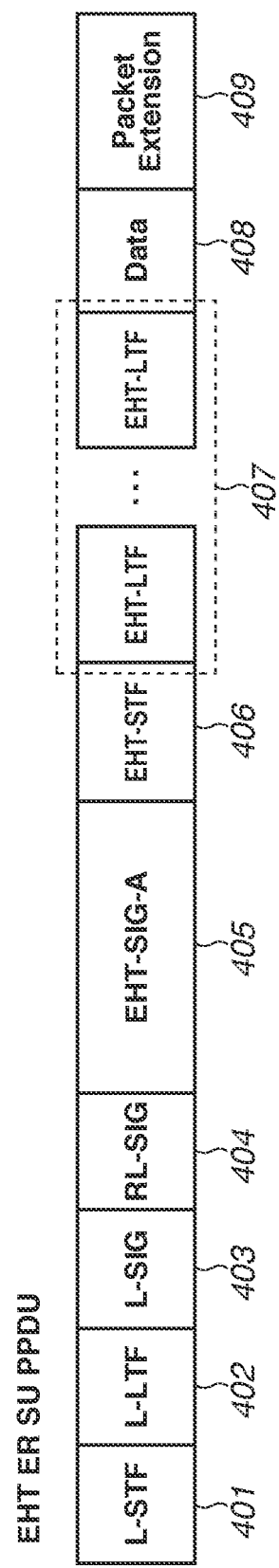
FIG. 4 is a diagram illustrating an example of a physical-layer (PHY) frame configuration of an EHT extended range (ER) SU PPDU transmitted from or received by a communication apparatus according to one embodiment.
Figure 5:
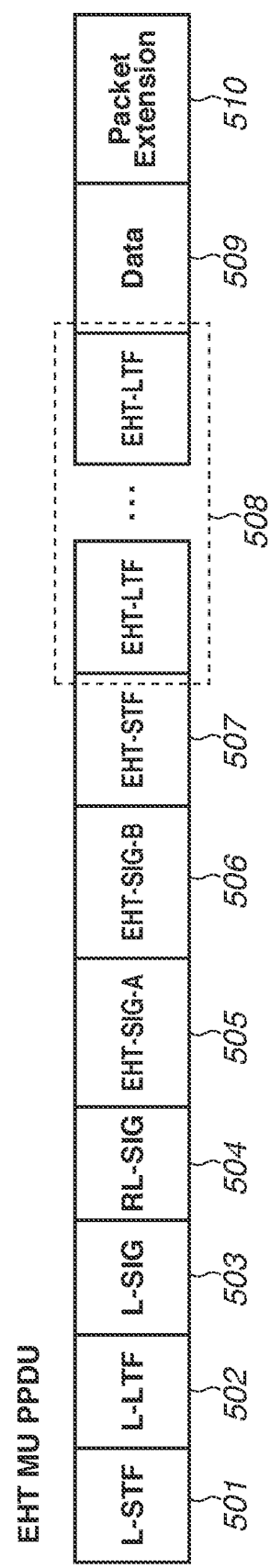
FIG. 5 is a diagram illustrating an example of a PHY frame configuration of an EHT multi-user (MU) PPDU transmitted from or received by a communication apparatus according to one embodiment.

FIGS. 3 to 5 each illustrate an example of a configuration of a wireless frame (a physical-layer protocol data unit (PPDU)) transmitted from or received by the communication apparatus 102. FIG. 3 illustrates an example of a physical-layer (PHY) frame configuration of an EHT single-user (SU) PPDU for single-user communication. FIG. 4 illustrates an example of a PHY frame configuration of an EHT extended range (ER) SU PPDU for long-distance transmission. The EHT ER SU PPDU is used in a case where communication in an extended communication range is performed between an AP and a single STA. FIG. 5 illustrates an example of a PHY frame configuration of an EHT multi-user (MU) PPDU for multi-user communication.

Each PPDU includes a short training field (STF), a long training field (LTF), and a signal field (SIG). As illustrated in FIG. 3, a beginning portion of the EHT SU PPDU includes a legacy short training field (L-STF) 301, a legacy long training field (L-LTF) 302, and a legacy signal field (L-SIG) 303 for ensuring backward compatibility with the IEEE 802.11a/b/g/n/ax standards as legacy standards. Similarly, the PPDUs illustrated in FIGS. 4 and 5 also include L-STFs 401 and 501, L-LTFs 402 and 502, and L-SIGs 403 and 503. In each PPDU, the L-LTF is arranged to be communicated immediately after the L-STF, and the L-SIG is arranged to be communicated immediately after the L-LTF.

In each of the frame configurations illustrated in FIGS. 3 to 5, a repeated legacy signal field (RL-SIG) 304, 404, or 504 arranged to be communicated immediately after the L-SIG is included in the PPDU. The RL-SIG field repeatedly includes the content of the L-SIG. The RL-SIG is included so that a communication apparatus that receives the PPDU can recognize that the PPDU is compliant with the IEEE 802.11ax standard or later. Thus, the RL-SIG may be omitted in a PPDU compliant with the IEEE 802.11be standard. Alternatively, in a PPDU compliant with the IEEE 802.11be standard, a field that allows a reception apparatus to recognize that the PPDU is compliant with the IEEE 802.11be standard may be newly provided instead of the RL-SIG.

The L-STF 301 is used to detect a PHY frame signal, perform automatic gain control (AGC), or detect a timing. The L-LTF 302 is used to synchronize frequencies and times with high accuracy or acquire channel state information (CSI). The L-SIG 303 is used to transmit control information including information regarding a physical layer data rate, a modulation and coding scheme (MCS), and a PHY frame length. A legacy device (a non-EHT device) that is not compliant with the IEEE 802.11be standard and is compliant with the IEEE 802.11a/b/g/n/ax standards can decode the L-STF 301, the L-LTF 302, and the L-SIG 303 (legacy fields).

Each PPDU further includes an EHT-SIG that is arranged to be communicated immediately after the RL-SIG and is used to communicate control information for communication compliant with the IEEE 802.11be standard. The EHT SU PPDU illustrated in FIG. 3 includes EHT-SIG-A 305, and the EHT ER SU PPDU illustrated in FIG. 4 includes EHT-SIG-A 405. The EHT MU PPDU illustrated in FIG. 5 includes EHT-SIG-A 505 and EHT-SIG-B 506. Each EHT-SIG field includes information necessary for a process for receiving the EHT PPDU.

Each PPDU also includes an STF (an EHT-STF 306, 406, or 507) and LTFs (EHT-LTFs 307, 407, or 508) for communication compliant with the IEEE 802.11be standard. The EHT-STF is arranged to be communicated immediately after the EHT-SIG, and the EHT-LTFs are arranged to be communicated immediately after the EHT-STF.

Each PPDU includes a data field 308, 408, or 509 and a packet extension field 309, 409, or 510 after these fields for control. In each PPDU, the fields from the L-STF to the EHT-LTFs are termed a "PHY preamble". The fields of the PPDUs do not necessarily need to be arranged in the orders illustrated in FIGS. 3 to 5, and a new field not illustrated in FIGS. 3 to 5 may be included.

FIGS. 3 to 5 each illustrate as an example a PPDU capable of ensuring backward compatibility. If, however, it is not necessary to ensure the backward compatibility, for example, the legacy fields may be omitted. In this case, for example, the EHT-STF and the EHT-LTFs may be included at the beginning of the PPDU instead of the L-STF and the L-LTF to establish synchronization. In this case, at least one of the EHT-STF and the plurality of EHT-LTFs arranged after the EHT-SIG field in the PPDU may be omitted.

As illustrated in tables 1 and 2, the EHT-SIG-A 305 and the EHT-SIG-A 405 included in the EHT SU PPDU and the EHT ER SU PPDU, respectively, each include EHT-SIG-A1 and EHT-SIG-A2 indicating information necessary to receive the PPDU. In the present exemplary embodiment, a "SOMA" sub-field indicating whether SOMA is used in the transmission of data included in the data field in the PPDU is included in at least one of the EHT-SIG-A1 and the EHT-SIG-A2.

If the SOMA sub-field is included in the EHT-SIG-A1, the SOMA sub-field may not be included in the EHT-SIG-A2. If the SOMA sub-field is included in the EHT-SIG-A2, the SOMA sub-field may not be included in the EHT-SIG-A1. Alternatively, the SOMA sub-field may be included in both the EHT-SIG-A1 and the EHT-SIG-A2.

As illustrated in tables 3 and 4, the EHT-SIG-A 505 of the EHT MU PPDU in FIG. 5 includes EHT-SIG-A1 and EHT-SIG-A2 indicating information necessary to receive the PPDU. In the EHT MU PPDU according to the present exemplary embodiment, a SOMA sub-field as described above is included in the EHT-SIG-A2. Alternatively, also in the EHT MU PPDU, the SOMA sub-field may be included in the EHT-SIG-A1, or may be included in both the EHT-SIG-A1 and the EHT-SIG-A2.

In the present exemplary embodiment, if SOMA is used to transmit data, 1 is set to the SOMA sub-field. If SOMA is not used, 0 is set to the SOMA sub-field. This is, however, merely an example. Alternatively, if SOMA is used to transmit data, 0 may be set to the SOMA sub-field. If SOMA is not used, 1 may be set to the SOMA sub-field. The present disclosure is not limited to these examples. The SOMA sub-field only needs to include information that allows an apparatus that receives the PPDU to recognize that SOMA is used to transmit data included in the PPDU.

If a value indicating that SOMA is used is set to the SOMA sub-field, data included in the data field in the same PPDU is multiplexed by using SOMA. If, on the other hand, a value indicating that SOMA is not used is set to the SOMA sub-field, data included in the data field in the same PPDU is not multiplexed by using SOMA.

Consequently, a communication apparatus that receives the PPDU including the SOMA sub-field can recognize that it is necessary to perform a reception process compatible with SOMA as a process for receiving the PPDU. Thus, the communication apparatus can appropriately determine whether to perform the reception process compatible with SOMA.

The configurations of frames illustrated in tables 1 to 4 are merely examples, and other configurations may be used. For example, in each of the EHT SU PPDU and the EHT ER SU PPDU, notification of the information regarding SOMA may be given at a position other than the fifteenth bit of the EHT-SIG-A1 field or the EHT-SIG-A2 field. Similarly, in the EHT MU PPDU, notification of the information regarding SOMA may be given at a position other than the eighth bit of the EHT-SIG-A2 field. At least one of the names or the contents of fields illustrated in tables 1 to 4 may be different from that illustrated in tables 1 to 4.

TABLE 1

| | Bit Position | Sub-Field | Number of Bits | Description |
|---|---|---|---|---|
| EHT-SIG-A1 | B0 | Format | 1 | To distinguish PPDU from EHT TB PPDU, 1 if "EHT PPDU and EHT ER PPDU" |
| | B1 | Beam Change | 1 | 1 if pre-EHT of PPDU is arranged in different space from first symbol of EHT-LTF, 0 if similarly mapped |
| | B2 | UL/DL | 1 | Indicates whether PPDU is for UL or for DL, and has same value as TXVECTOR UPLINK_FLAG |
| | B3-B6 | MCS | 4 | Value of modulation and coding scheme If EHT SU PPDU: n = 0, 1, 2, . . . , 11 (12 to 15 are reserved) If EHT ER SU PPDU and if bandwidth = 0: n = 0, 1, 2 (3 to 15 are reserved areas) If EHT ER SU PPDU and if bandwidth = 1: n = 0 (1 to 15 are reserved areas) in MCS 0 |
| | B7 | DCM | 1 | Indicates whether dual carrier modulation is applied to data field If STBC field is 0: 1 (If both DCM and STBC fields are 1, neither is applied) If DCM is not applied: 0 |

TABLE 1-continued

| Bit Position | Sub-Field | Number of Bits | Description |
|---|---|---|---|
| B8-B13 | BSS Color | 6 | 6 bits for identifying BSS |
| B14 | SOMA | 1 | If multiplexed using SOMA: 1<br>If not multiplexed using SOMA: 0 |
| B15-B18 | Spatial Reuse | 4 | Indicates whether Spatial Reuse is permitted during transmission of the PPDU<br>Value of Spatial Reuse field encoding illustrated in appendix is set |
| B19-B20 | Bandwidth | 2 | If EHT SU PPDU:<br>0 if 20 MHz, 1 if 40 MHz, 2 if 80 MHz, 3 if 160 MHz (80 + 80 MHz)<br>If EHT ER SU PPDU:<br>0 if 242-tone RU, 1 if upper 106-tone RU in primary 20 MHz |
| B21-B22 | GI + LTF Size | 2 | Indicates guard interval period and size of EHT-LTF<br>0 if 1 × EHT-LTF and 0.8 μs GI,<br>1 if 2 × EHT-LTF and 0.8 μs GI,<br>2 if 2 × EHT-LTF and 1.6 μs GI,<br>3 if both DCM and STBC fields are 1 and if 4 × EHT-LTF and 0.8 μs GI,<br>3 if 4 × EHT-LTF other than above and 3.2 μs GI |
| B23-B25 | NSTS and Midamble Periodicity | 3 | Number of space-time streams and periodicity of midamble for synchronizing frames<br>If Doppler field is 0: number of space-time streams is −1<br>If Doppler field is 1: B23-B24 are number of space-time streams<br>B25 is 0 if midamble periodicity is 10, and 1 if 20 |

TABLE 2

| | Bit Position | Sub-Field | Number of Bits | Description |
|---|---|---|---|---|
| EHT-SIG-A2 | B0-B6 | TXOP | 1 | Transmission opportunity<br>127 is set if TXOP_DURATION of TXVECTOR is UNSPECIFIED and period information is not present. Value smaller than 127 is set to set NAV if TXOP_DURATION of TXVECTOR is smaller than 512. At this time, if B0 is 0, B1-B6 are FLOOR (truncation) of TXOP_DURATION/8. If B0 is 1, B1-B6 are FLOOR of (TXOP_DURATION − 512)/8. |
| | B7 | Coding | 1 | 0 if binary convolutional code (BCC),<br>1 if low density parity check (LDPC) |
| | B8 | LDPC Extra Symbol Segment | 1 | Indicates presence or absence of extra OFDM symbol segment for LDPC |
| | B9 | STBC | 1 | Using space-time block coding (STBC), this field is 1 if DCM is zero, also 1 if neither DCM nor STBC is applied, 0 in other cases |
| | B10 | Beamformed | 1 | 1 if beam forming and steering are applied to waveform of SU transmission |
| | B11-B12 | Pre-FEC Padding Factor | 2 | 0 if pre-FEC padding factor is 4, 1 if it is 1, 2 if it is 2, 3 if it is 3 |
| | B13 | PE Disambiguity | 1 | Disambiguity field of packet extension |
| | B14 | SOMA | 1 | If multiplexed using SOMA: 1<br>If not multiplexed using SOMA: 0 |
| | B15 | Doppler | 1 | 1 if either of following conditions is satisfied<br>Number of OFDM symbols in data field is greater than "value indicated in midamble periodicity + 1" and midamble is present<br>Number of OFDM symbols in data field is less than or equal to "value indicated in midamble periodicity + 1", midamble is not present, and channels change quickly |

TABLE 2-continued

| Bit Position | Sub-Field | Number of Bits | Description |
| --- | --- | --- | --- |
| B16-B19 | CRC | 4 | CRC of preceding EHT-SIG-A (total of 42 bits including 26 bits in A1 and 16 bits from B0 to B15 in A2) fields |
| B20-B25 | Tail | 6 | Area where 0 is set to indicate end to trellis convolutional decoder |

TABLE 3

| | Bit Position | Sub-Field | Number of Bits | Description |
| --- | --- | --- | --- | --- |
| EHT-SIG-A1 | B0 | UL/DL | 1 | Indicates whether PPDU is for UL or for DL, and has same value as TXVECTOR UPLINK_FLAG |
| | B1-B3 | SIGB MCS | 3 | Indicates MCS of EHT-SIG-B field. 0 if MCS is 0, 1 if MCS is 1, 2 if MCS is 2, 3 if MCS is 3, 4 if MCS is 4, 5 if MCS is 5, 6 and 7 are reserved areas |
| | B4 | SIGB DCM | 1 | 1 if EHT-SIG-B field is modulated by DCM |
| | B5-B10 | BSS Color | 6 | 6 bits for identifying BSS |
| | B11-B14 | Spatial Reuse | 4 | Indicates whether Spatial Reuse is permitted during transmission of the PPDU Value of Spatial Reuse field encoding illustrated in appendix is set |
| | B15-B17 | Bandwidth | 3 | 0 if 20 MHz, 1 if 40 MHz, 2 if 80 MHz, 3 if 160 MHz (80 + 80 MHz) If SIGB compression field is 0, 4 if only secondary 20 MHz is puncturing in preamble puncturing in 80 MHz 5 if two 20 MHz portions of secondary 40 MHz are puncturing in preamble puncturing in 80 MHz 6 if only secondary 20 MHz is puncturing in preamble puncturing in 160 (or 80 + 80) MHz 7 if only secondary 40 MHz is puncturing in preamble puncturing in 160 (or 80 + 80) MHz If SIGB field indicates 1, values 4 to 7 mean reservation |
| | B18-B21 | Number of EHT-SIG-B Symbols or MU-MIMO Users | 4 | Indicates number of OFDMA symbols in EHT-SIG-B if SIG compression field is 0. If number of OFDM symbols in EHT-SIG-B is smaller than 16, this means a number obtained by subtracting 1 from the number of OFDM symbols in EHT-SIG-B. If support capability for the number of OFDM symbols in EHT SIG-B greater than 16 is set to 0 in at least one reception terminal, 15 is set to indicate that the number of OFDM symbols in EHT-SIG-B is 16. If support capabilities for the number of OFDM symbols in EHT-SIG-B greater than 16 are set to 0 in all reception terminals, and data rate of EHT-SIG-B is smaller than MCS 4 that does not use DCM, 15 is set to indicate that the number of OFDM symbols in EHT SIG-B is greater than or equal to 16. If SIG compression field is 1, this means a number obtained by subtracting 1 from the number of MU-MIMO users. |
| | B22 | SIG Compression | 1 | 1 if common field is present in EHT-SIG-B |
| | B23-B24 | GI + LTF Size | 2 | Indicates guard interval period and size of EHT-LTF 0 if 4 × EHT-LTF and 0.8 μs GI, 1 if 2 × EHT-LTF and 0.8 μs GI, 2 if 2 × EHT-LTF and 1.6 μs GI, 3 if 4 × EHT-LTF and 3.2 μs GI |
| | B25 | Doppler | 1 | 1 if either of following conditions is satisfied Number of OFDM symbols in data field is greater than "value indicated in midamble periodicity + 1" and midamble is present Number of OFDM symbols in data field is less than or equal to "value indicated in midamble periodicity + 1", midamble is not present, and channels change quickly |

TABLE 4

| Bit Position | Sub-Field | Number of Bits | Description |
|---|---|---|---|
| EHT-SIG-A2 B0-B6 | TXOP | 1 | Transmission opportunity<br>127 is set if TXOP_DURATION of TXVECTOR is UNSPECIFIED and period information is not present.<br>A value smaller than 127 is set to set NAV if TXOP_DURATION of TXVECTOR is smaller than 512. At this time, if B0 is 0, B1-B6 are FLOOR (truncation) of TXOP_DURATION/8.<br>If B0 is 1, B1-B6 are FLOOR of (TXOP_DURATION − 512)/8. |
| B7 | SOMA | 1 | If multiplexed using SOMA: 1<br>If not multiplexed using SOMA: 0 |
| B8-B10 | Number of EHT-LTF Symbols and Midamble Periodicity | 3 | Indicates number of EHT-LTFs.<br>0 if 1 × EHT-LTF,<br>1 if 2 × EHT-LTF,<br>2 if 4 × EHT-LTF,<br>3 if 6 × EHT-LTF,<br>4 if 8 × EHT-LTF<br>If Doppler field is 1, B8-B9 indicate number of EHT-LTF symbols, and B10 indicates midamble periodicity. |
| B11 | LDPC Extra Symbol Segment | 1 | Indicates presence or absence of extra OFDM symbol segment for LDPC |
| B12 | STBC | 1 | If number of users in each Resource Unit (RU) is not greater than 1, 1 is set to indicate that data is coded using STBC. |
| B13-B14 | Pre-FEC Padding Factor | 2 | 0 if pre-FEC padding factor is 4, 1 if it is 1, 2 if it is 2, 3 if it is 3 |
| B15 | PE Disambiguity | 1 | Disambiguity field of packet extension |
| B16-B19 | CRC | 4 | CRC of preceding EHT-SIG-A (total of 42 bits including 26 bits in A1 and 16 bits from B0 to B15 in A2) fields |
| B20-B25 | Tail | 6 | Area where 0 is set to indicate an end to trellis convolutional decoder |

In addition to the EHT-SIG-A1 field and the EHT-SIG-A2 field, each PPDU may include another field. In the present exemplary embodiment, this field is referred to as an "EHT-SIG-x field" which is arranged to be communicated immediately after the EHT-SIG-A1 field or the EHT-SIG-A2 field. Alternatively, the EHT-SIG-x field may be arranged to be communicated immediately after the EHT-SIG-B field. The EHT-SIG-x field may be arranged to be communicated before or after any field in each of the PPDU frames illustrated in FIGS. 3 to 5. Yet alternatively, at least part of sub-fields included in the EHT-SIG-x field may be included in at least one of the EHT-SIG-A1 field, the EHT-SIG-A2 field, and the EHT-SIG-B field.

The EHT-SIG-x field can include a sub-field specifying a parameter regarding SOMA. The EHT-SIG-x field may include information other than that illustrated in table 5. Table 5 illustrates an example of information stored in the EHT-SIG-x field.

TABLE 5

| | | | SOMA | Whether multiplexed using SOMA |
|---|---|---|---|---|
| ETH-SIG-x | Destination_0 | ID | | Identifier of Destination_0 |
| | | Super Position | | Whether combined constellation process is necessary at Destination_0 |
| | | MCS | | MCS corresponding to Destination_0 |
| | | TX power | | Transmission power to Destination_0 |
| | | Bit Allocation | | Position of bit allocated to Destination_0 |
| | Destination_1 | ID | | Identifier of Destination_1 |
| | | Super Position | | Whether combined constellation process is necessary at Destination_1 |
| | | MCS | | MCS corresponding to Destination_1 |
| | | TX power | | Transmission power to Destination_1 |
| | | Bit allocation | | Position of bit allocated to Destination_1 |

The EHT-SIG-x may include the SOMA sub-field illustrated in tables 1 to 4. If the SOMA sub-field is included in the EHT-SIG-x, the SOMA sub-field does not need to be included in the EHT-SIG-A1 field or the EHT-SIG-A2 field. Alternatively, the SOMA sub-field may be included in both the EHT-SIG-x field and the EHT-SIG-A1 field or the EHT-SIG-A2 field.

In the present exemplary embodiment, the EHT-SIG-x includes a single structured sub-field for each destination of data. Hereinafter, the sub-field will be referred to as a "Destination_y sub-field" (y is an integer greater than or equal to 0). A single Destination_y sub-field may include a single OFDM symbol, or may include a plurality of OFDM symbols. The Destination_y sub-field includes at least one of the identifier (ID) of an STA as a destination, and a field indicating whether a combined constellation process is necessary. In addition to or instead of these fields, the Destination_y sub-field includes at least one of fields indicating an MCS index to be used, the position of an allocated bit, and transmission power. The MCS is information indicating a modulation method and a coding rate. In the present exemplary embodiment, these fields are referred to as an "ID field", a "super position field", an "MCS field", a "bit allocation field", and a "TX power field".

The ID field is a field indicating information that enables identification of an STA. The ID field includes 11 bits, for example. In the present exemplary embodiment, the identifier of an STA corresponding to the Destination_y sub-field is stored. As the identifier, for example, the media access control (MAC) address of the STA is used. Alternatively, instead of the identifier of the STA, a group identifier indicating a group including one or more STAs may be stored in the ID field.

The super position field is a field indicating whether the combined constellation process needs to be applied. The super position field includes 1 bit, for example. In the present exemplary embodiment, a communication apparatus that transmits a PPDU stores 1 in the super position field, thereby indicating that the combined constellation process needs to be used by the STA corresponding to the Destination_y sub-field. A communication apparatus that transmits a PPDU stores 0 in the super position field to indicate that the combined constellation process does not need to be used by the STA corresponding to the Destination_y sub-field. In the present exemplary embodiment, 0 or 1 is stored in the super position field, whereby it is possible to indicate whether the combined constellation process needs to be applied. The present disclosure, however, is not limited to this example. A communication apparatus that transmits the PPDU may indicate, using a character string or a code, whether the combined constellation process needs to be applied.

If SOMA is used, a communication apparatus addressed as the destination of data which requires larger transmission power can process data requiring smaller transmission power which is addressed to other communication apparatuses as noise, and therefore does not need to execute the combined constellation process. Thus, the super position field may be set to 0 for a communication apparatus addressed as the destination of data which requires larger transmission power.

The combined constellation process is the process of determining a combined constellation to be applied to primary demodulation, using at least one of the values of the MCS fields and the TX power fields within a plurality of Destination_y sub-fields.

The combined constellation process according to the present exemplary embodiment is performed as follows. A constellation corresponding to the value of the MCS field within a received Destination_0 sub-field can be represented as $\{C_{0i}\}$, which is a set of signal points $C_{0i}$ (i=0, 1, ..., m−1). Similarly, a constellation corresponding to the value of the MCS field within a Destination_1 sub-field can be represented as $\{C_{1j}\}$ (j=0, 1, ..., n−1). $C_{0i}$ and $C_{1j}$ are complex numbers, and m and n are the numbers of signal points included in the constellations. Based on the value of the TX power field within the Destination_0 sub-field and the value of the TX power field within the Destination_1 sub-field, the total transmission power is determined. The ratio of transmission power to the Destination_0 to the determined total transmission power is α. The ratio of transmission power to the Destination_1 to the total transmission power is 1−α. In this case, a combined constellation is expressed as $\{\text{root}(\alpha)C_{0i}+\text{root}(1-\alpha)C_{1j}\}$ ((i, j) are the combination of values that can be taken by i and j). The root(x) represents the square root of x.

For example, if a primary modulation method for the Destination_0 and the Destination_1 is QPSK, the combined constellation includes 16 signal points. If α=0.2, the constellation is normalized by the total transmission power, thereby coming to be the same as that obtained by 16 quadrature amplitude modulation (QAM) defined by the IEEE 802.11 standards.

A communication apparatus that receives the PPDU performs the above process and thereby can calculate a combined constellation from the pieces of information included in the Destination_0 sub-field and the Destination_1 sub-field. The present disclosure is not limited to this method. Alternatively, a communication apparatus that receives the PPDU may hold a table illustrating the correspondences between the value of the MCS field and the value of the TX power field, and a combined constellation.

The MCS field is a field indicating an MCS used to transmit data using SOMA according to the EHT standard. The MCS is information indicating the combination of the coding rate and the modulation method of data. In the present exemplary embodiment, the MCS field is configured as a field of cell{log$_2$(the number of types of MCSs that can be used to transmit data using SOMA)} bits. In this case, ceil(x) is a ceiling function with x as an argument and is a function that returns the smallest integer which is greater than or equal to x. If the number of types of MCSs used to transmit data using SOMA is equal to the number of types of MCSs in a case where SOMA is not used, the number of bits in this field is 4 bits or more. If, on the other hand, the number of types of MCSs used to transmit data using SOMA is smaller than the number of types of MCSs in a case where SOMA is not used, the number of bits in this field can be 4 bits or less.

The present disclosure is not limited to the embodiment. Alternatively, if the MCS included in the MCS field indicates only a primary modulation method, the MCS field may be configured as a field indicating a primary modulation method that can be used to transmit data using SOMA according to the IEEE 802.11be standard. The MCS field is a field including ceil(log$_2$(the number of types of primary modulation methods that can be used to transmit data using SOMA)) bits at minimum. For example, if primary modulation methods are of seven types, namely binary phase-shift keying (BPSK), quadrature phase-shift keying (QPSK), 16-QAM, 64-QAM, 256-QAM, 1024-QAM, and 4096-QAM, the MCS field is configured as a field of 3 bits at minimum. If, on the other hand, primary modulation methods that can be used are of only two types, namely BPSK and QPSK, the minimum number of bits in the MCS field is 1 bit. If primary modulation methods that can be used are of only three types, namely BPSK, QPSK, and 16-QAM, the minimum number of bits in the MCS field is 2 bits.

If the value of the super position field indicates that the combined constellation process is necessary, the MCS field may be configured as a field indicating a combined constellation. In this case, the combined constellation process is performed by a communication apparatus that transmits the PPDU, and information indicating a combined constellation corresponding to the processing result is stored in this field. The minimum number of bits in this field is ceil(log$_2$(the number of types of combined constellations)). For example, if the combined constellation can be indicated by seven types of constellations defined by the IEEE 802.11 standards, the MCS field is configured as a field of 3 bits at minimum. The seven types of constellations defined by the IEEE 802.11 standards are BPSK, QPSK, 16-QAM, 64-QAM, 256-QAM, 1024-QAM, and 4096-QAM.

The TX power field indicates, in the transmission power of data included in the data field, transmission power allocated to data for the STA (or the group of STAs) corresponding to the Destination_y sub-field. Information indicating the transmission power included in the TX power field indicates the absolute value of power allocated to the STA or the group corresponding to the Destination_y sub-field. Alternatively, the information may indicate the ratio or the proportion of transmission power used in the combined constellation process. Yet alternatively, the transmission power may be indicated in another form such as an index corresponding to the absolute value of the transmission power. The value of the transmission power may be indicated by a floating point or integer constant. The number of bits in the TX power field may be at least one of 8 bits, 16 bits, 32 bits, and 64 bits. Alternatively, the number of bits in the TX power field may be any number of bits. Yet alternatively, the value of the transmission power may be indicated by coding the transmission power into a fewer number of bits.

In the present exemplary embodiment, if the TX power field indicates the proportion of power allocated to the STA or the group corresponding to the Destination_y sub-field, the minimum value of the number of bits is ceil(log$_2$(the number of types of proportions)). If the types of proportions of the transmission power are nine types, namely 0.1+0.1*i (i=0, 1, . . . , 8), the TX power field may be configured as a field of 4 bits at minimum.

The bit allocation field is a field indicating the position of a bit allocated to the STA corresponding to the Destination_y sub-field among bits obtained by demapping the signal points included in the combined constellation. Alternatively, the bit allocation field may indicate the position of a bit allocated to the group of STAs corresponding to the Destination_y sub-field. The bit allocation field includes the number of bits required to uniquely identify the position of a bit allocated to the STA or the group of STAs among bits obtained by demapping the signal points included in the combined constellation.

The position of a bit allocated to the STA or the group of STAs indicated by the bit allocation field may be indicated in a bitmap format. In this case, the bit allocation field includes the number of bits greater than or equal to the maximum multi-valued number that can be taken by the combined constellation. In the present exemplary embodiment, in information included in the bit allocation field, the position of a bit having a value of 1 indicates the position of a bit allocated to the STA. The position of a bit having a value of 0 indicates the position of a bit that is not allocated to the STA. The correspondence relationships between values and the allocation are not limited thereto. Alternatively, 0 may indicate the position of an allocated bit, and 1 may indicate the position of a bit that is not allocated.

For example, if the combined constellation includes a maximum of 4096 signal points, the maximum multi-valued number is 12. Thus, the bit allocation field includes 12 bits or more. In this case, if the bit allocation field includes 12 bits, these 12 bits are represented as {b0, b1, . . . , b11}. For example, suppose that the combined constellation includes 16 signal points (i.e., the multi-valued number is 4), and the positions of bits allocated to the STA are the second and fourth bits. In this case, the bit allocation field includes information indicating {b0, b1, . . . , b11}={0, 1, 0, 1, 0, . . . , 0}.

Alternatively, the bit allocation field may include, as information indicating the allocation pattern of the position of an allocated bit, an index corresponding to the pattern. In this case, the bit allocation field includes ceil(log$_2$(the number of bit allocation patterns)) bits or more. For example, if the allocation patterns are of two types, namely an even-numbered bit and an odd-numbered bit, the bit allocation field includes 1 bit or more.

If the value of the super position field within the corresponding Destination_y sub-field indicates that the combined constellation process is not necessary, the value of the bit allocation field may not be set. In this case, the bit allocation field may be omitted.

The sub-fields included in the EHT-SIG-x field illustrated in the present exemplary embodiment are merely examples, and only some of these sub-fields may be stored in the EHT-SIG-x field or one or a plurality of Destination_y sub-fields in the EHT-SIG-x field. Alternatively, a sub-field indicating another piece of information may be included in the EHT-SIG-x field or one or a plurality of Destination_y sub-fields in the EHT-SIG-x field. Yet alternatively, in a case where a parameter regarding SOMA (a combined constellation or transmission power) is determined in advance between a communication apparatus that transmits the PPDU and a communication apparatus that receives the PPDU, the EHT-SIG-x field or at least one sub-field in the EHT-SIG-x field may be omitted. The parameter regarding SOMA may be preset in each communication apparatus, or set by the user. If the parameter regarding SOMA is not used in a process for receiving the PPDU, the EHT-SIG-x field may be omitted. If there is a parameter regarding SOMA that is not used in the process for receiving the PPDU, a corresponding sub-field in the EHT-SIG-x field may be omitted.

The EHT-SIG-B 506 of the EHT MU PPDU includes a common field and a user block field including information necessary to receive the PPDU. The user block field can store information regarding each user (each reception apparatus). Thus, the user block field may store information in the EHT-SIG-x. That is, information regarding each reception apparatus, such as the ID, the super position, the MCS, the TX power, and the bit allocation, may be transmitted and received using the user block field. Information in the SOMA sub-field indicating whether SOMA is used may be transmitted and received by including the information in the common field. Alternatively, the information in the SOMA sub-field may be included in the user block field to indicate whether SOMA is used with respect to each reception apparatus.

As described above, the communication apparatus that receives the PPDU confirms, based on information included in the SOMA sub-field, whether SOMA is used for data addressed to the communication apparatus. If SOMA is used, the communication apparatus can further acquire a parameter regarding SOMA. Then, by using the acquired parameter, the communication apparatus that receives the PPDU can separate the data multiplexed using SOMA from other pieces of data and demodulate the separated data.

FIG. 6 is a flowchart illustrating processing realized by loading a computer program stored in the storage unit 201 into the control unit 202 and executing the program when the communication apparatus 102 transmits a PPDU.

The flowchart in FIG. 6 is started when the communication apparatus 102 transmits data to other communication apparatuses (e.g., to at least two of the communication apparatuses 103 to 105). Specifically, the flowchart is started when the communication apparatus 102 receives or generates data to be transmitted to the other communication apparatuses. Alternatively, the flowchart may be started when the communication apparatus 102 receives from the user an instruction to transmit data addressed to the other communication apparatuses to the other communication apparatuses.

In step S601, the communication apparatus 102 generates data which is included in a data field of the PPDU to be transmitted. Then, in step S602, the communication apparatus 102 determines whether SOMA is to be used to multiplex the data generated in step S601. The determination in step S602 is made in accordance with the user's choice. If the user chooses to use SOMA to multiplex the data, the determination of the communication apparatus 102 is YES in step S602. If the user chooses not to use SOMA to multiplex the data, the determination of the communication apparatus 102 is NO in step S602. The user can choose whether to use SOMA, after step S601 or in advance. Alternatively, whether SOMA is to be used to multiplex data may be preset in the communication apparatus 102.

Yet alternatively, the communication apparatus 102 may make the determination in step S602 according to whether the other communication apparatuses as the destinations of the data support SOMA. The communication apparatus 102 may acquire capability information indicating whether the other communication apparatuses as the destinations of the data support SOMA, from the other communication apparatuses in advance or after step S601. If the other communication apparatuses as the destinations of the data support SOMA, the determination of the communication apparatus 102 is YES in step S602. If the other communication apparatuses do not support SOMA, the determination of the communication apparatus 102 is NO in step S602.

Yet alternatively, the communication apparatus 102 may make the determination in step S602 according to the differences of distances between the communication apparatus 102 and each of other communication apparatuses as the destinations of the data. The communication apparatus 102 compares the distance between the communication apparatus 102 and the communication apparatus 103 as the destination of the data with the distance between the communication apparatus 102 and the communication apparatus 104 as the destination of the data. If the difference of the distances is greater than a predetermined threshold, the determination is YES in step S602. If, on the other hand, the difference of the distance between the communication apparatus 102 and the communication apparatus 103 from the distance between the communication apparatus 102 and the communication apparatus 104 is smaller than the predetermined threshold, the determination is NO in step S602.

If it is determined that SOMA is to be used (YES in step S602), then in step S603, the communication apparatus 102 generates a PHY preamble by setting the value of a SOMA sub-field in an EHT-SIG field to "1". Alternatively, the communication apparatus 102 may generate a PHY preamble including an EHT-SIG-x field indicating a parameter regarding SOMA in addition to or instead of a SOMA sub-field. If, on the other hand, it is determined that SOMA is not to be used (NO in step S602), then in step S604, the communication apparatus generates a PHY preamble by setting the value of a SOMA sub-field in an EHT-SIG field to "0". Alternatively, the communication apparatus 102 may generate a PHY preamble that does not include a SOMA sub-field and an EHT-SIG-x field indicating a parameter regarding SOMA.

Then, if the PHY preamble is generated in step S603 or S604, then in step S605, the communication apparatus 102 generates a wireless frame including the generated PHY preamble and the data generated in step S601 and transmits the generated wireless frame to the other communication apparatuses. When the communication apparatus 102 executes the process of step S605, the processing of this flow is ended.

As illustrated in FIG. 6, a communication apparatus that transmits the PPDU transmits a wireless frame including the PHY preamble indicating whether data has been multiplexed using SOMA, whereby a communication apparatus that receives the PPDU can execute an appropriate reception process.

The communication apparatus 102 includes an EHT-SIG-x field indicating a parameter regarding SOMA in the PHY preamble and thereby can cause another communication apparatus that receives the PPDU to execute a reception process using an appropriate parameter.

The communication apparatus 102 can indicate to a partner apparatus a parameter regarding SOMA for each PPDU to be transmitted, and therefore can use SOMA using the appropriate parameter in response to a change of a transmission environment in communication with the partner apparatus. The communication apparatus 102 can change a parameter to be used in SOMA according to a change in the distance from the partner apparatus. In response to an increase in the distance from the communication apparatus 103, the communication apparatus 102 may increase the transmission power of data to be transmitted to the communication apparatus 103, or may change the MCS to a lower coding rate or change a modulation method in which the amount of information that can be transmitted by a single symbol (signal) is smaller. Alternatively, in response to a decrease in the distance from the communication apparatus 103, the communication apparatus 102 may decrease the transmission power, or may change the MCS to a higher coding rate or change a modulation method in which the amount of information that can be transmitted by a single symbol (signal) is larger. The communication apparatus 102 determines the distance from the communication apparatus 103 based on the received signal strength indicator (RSSI) of a signal from the communication apparatus 103. If the RSSI of the signal received from the communication apparatus 103 has decreased, the communication apparatus 102 determines that the distance from the communication apparatus 103 has increased. If the RSSI has increased, on the other hand, the communication apparatus 102 determines that the distance from the communication apparatus 103 has decreased. Alternatively, the communication apparatus 102 may change the parameter regarding SOMA according to a change in the error rate in communication with the partner apparatus. If the error rate of communication with the communication apparatus 103 deteriorates, the communication apparatus 102 may change the MCS to a lower coding rate or change the modulation method in which the amount of information that can be transmitted by a single symbol (signal) is smaller. If the error rate in communication with the communication apparatus 103 improves, the communication apparatus 102 may change the MCS to a higher coding rate or change the modulation method in which the amount of information that can be transmitted by a single symbol (signal) is larger. As described above, the communication apparatus 102 can set an appropriate parameter regarding SOMA in response to a change in a transmission environment in communication with a partner apparatus.

FIG. 7 is a flowchart illustrating processing realized by loading a computer program stored in the storage unit 201 into the control unit 202 and executing the program when the communication apparatus 103 receives the PPDU.

The flowchart in FIG. 7 is started when the communication apparatus 103 waits for a signal from another communication apparatus. The communication apparatus 103 may always wait for a signal from another communication apparatus, or may repeat in a predetermined cycle the period in which the communication apparatus 103 communicates with another communication apparatus and the period in which the communication apparatus 103 does not communicate with another communication apparatus. In the period in which the communication apparatus 103 does not communicate with another communication apparatus, the communication apparatus 103 makes power to be supplied to the communication unit 206 lower than in the period in which the communication apparatus 103 communicates with another communication apparatus, and thereby can operate in a power-saving manner.

In step S701, the communication apparatus 103 receives the PPDU frame having the above frame configuration from the communication apparatus 102.

In step S702, the communication apparatus 103 references the SOMA sub-field in the EHT-SIG included in the PHY preamble of the PPDU received in step S701 and determines whether SOMA is used to multiplex the data. If the referenced SOMA sub-field includes information indicating that SOMA is used to multiplex the data, the determination of the communication apparatus 103 is YES in step S702. If, on the other hand, the referenced SOMA sub-field does not include the information indicating that SOMA is used to multiplex the data, the determination of the communication apparatus 103 is NO in step S702.

Alternatively, the communication apparatus 103 may make the determination in step S702 based on whether the PHY preamble of the PPDU received in step S701 includes an EHT-SIG-x field indicating a parameter regarding SOMA. If the received PPDU includes the EHT-SIG-x field, the determination of the communication apparatus 103 is YES in step S702. If the received PPDU does not include the EHT-SIG-x field, the determination is NO in step S702.

If it is determined that SOMA is used (YES in step S702), then in step S703, the communication apparatus 103 executes a reception process, such as separating and demodulating data, corresponding to SOMA.

Specifically, first, the communication apparatus 103 references the ID fields in Destination_y sub-fields and identifies a Destination_y sub-field corresponding to the communication apparatus 103. Then, the communication apparatus 103 references the super position field in the Destination_y sub-field corresponding to the communication apparatus 103. If the super position field stores a value indicating that the combined constellation process is necessary, the communication apparatus 103 executes the combined constellation process to acquire the data addressed to the communication apparatus 103. That is, the communication apparatus 103 determines a combined constellation, and, based on a value stored in the bit allocation field, acquires a bit allocated to the communication apparatus 103.

If, on the other hand, the value of the super position field indicates that the combined constellation process is not necessary, the communication apparatus 103 acquires the data addressed to the communication apparatus 103 without executing the combined constellation process. In this case, the communication apparatus 103 does not need to reference the bit allocation field. Alternatively, the bit allocation field may be omitted. In this case, the communication apparatus 103 may reference the TX power fields in the Destination_y sub-fields corresponding to the communication apparatus 103 and the other reception apparatuses. Then, using the values of the TX power fields, the communication apparatus 103 may correct the magnitude of a signal to be received. Consequently, the communication apparatus 103 can demodulate the signal with higher accuracy. In a case where the communication apparatus 103 uses a parameter or a procedure determined in advance in the reception process for receiving the data using SOMA, the communication apparatus 103 may execute the reception process for receiving the data, without referencing the parameter included in the EHT-SIG-x field.

If the transmission power of the data addressed to the communication apparatus 103 is smaller than the transmission power of the data addressed to the other communication apparatuses, the super position field includes information indicating that the combined constellation process is necessary. If, on the other hand, the transmission power of the data addressed to the communication apparatus 103 is larger than the transmission power of the data addressed to the other communication apparatuses, the super position field does not include information indicating that the combined constellation process is necessary.

If it is determined that SOMA is not used (NO in step S702), then in step S704, the communication apparatus 103 executes a reception process for receiving the data using a different method from SOMA to acquire the data addressed to the communication apparatus 103. For example, the communication apparatus 103 executes a reception process for receiving the data using orthogonal multiple access (OMA).

If the communication apparatus 103 performs the process of step S703 or S704, the processing of this flow is ended. Based on the data obtained in step S703 or S704, the communication apparatus 103 can execute various types of control such as output control (the display or the printing of the data).

As illustrated in FIG. 7, the communication apparatus 103 can determine whether SOMA is used to multiplex the received data by referring information included in the PHY frame of the received PPDU. Consequently, the communication apparatus 103 can execute an appropriate data acquisition process (reception process) depending on whether SOMA is used to multiplex the received data.

The communication apparatus 103 receives a PHY preamble including an EHT-SIG-x field including a parameter regarding SOMA and thereby can execute a reception process using an appropriate parameter. Since the parameter regarding SOMA is indicated for each PPDU, the communication apparatus 103 can execute a reception process using an appropriate parameter with respect to each received PPDU. Consequently, the communication apparatus 102 that transmits data and the communication apparatus 103 can execute appropriate communication adapted to a change of a transmission path environment.

In the present exemplary embodiment, the processing in FIG. 6 is executed by the communication apparatus 102. The configuration, however, is not limited to this. At least a part of the processing in FIG. 6 may be executed by the communication unit 206 (the wireless chip) that is an information processing apparatus included in the communication apparatus 102. Similarly, in the present exemplary embodiment, the processing in FIG. 7 is executed by the communication apparatus 103. The configuration, however, is not limited to this. At least a part of the processing in FIG. 7 may be executed by the communication unit 206 (the wireless chip) that is an information processing apparatus included in the communication apparatus 103.

In the present exemplary embodiment, the communication apparatus 102 (an AP) transmits a PPDU, and the communication apparatus 103 (an STA) receives the PPDU. The configuration, however, is not limited to this. Alternatively, the communication apparatus 103 (the STA) may transmit a PPDU, and the communication apparatus 102 (the AP) may receive the PPDU. That is, the processing in FIG. 6 may be executed by the communication apparatus 103, and the processing in FIG. 7 may be executed by the communication apparatus 102.

The PHY preamble of a predetermined wireless frame such as a beacon or a probe response transmitted from the communication apparatus 102 (the AP) or a probe request transmitted from the communication apparatus 103 (the STA) may not include an EHT-SIG. In this case, the PHY preamble of the predetermined wireless frame includes legacy fields. The PHY preamble of the predetermined wireless frame may be configured to include an EHT-SIG but not to include a SOMA sub-field. As described above, it may be determined whether to include an EHT-SIG or include a field indicating information regarding SOMA according to the type of wireless frame.

At least a part or all of each of the flowchart of the communication apparatus 102 illustrated in FIG. 6 and the flowchart of the communication apparatus 103 illustrated in FIG. 7 may be achieved by hardware. In a case where a part or all of each of the flowcharts is achieved by hardware, for example, a dedicated circuit may be generated on an FPGA using a predetermined compiler according to a computer program for achieving the steps and used. Alternatively, a gate array circuit may be formed similarly to the FPGA and achieved as hardware. Yet alternatively, a part or all of each of the flowcharts may be achieved by an ASIC.

While the exemplary embodiments have been described in detail above, various embodiments of the present disclosure can employ exemplary embodiments as, for example, a system, an apparatus, a method, a program, and a recording medium (a storage medium). Specifically, various embodiments may be applied to a system including a plurality of devices (e.g., a host computer, an interface device, an imaging apparatus, and a web application), or may be applied to an apparatus including a single device, for example.

Various embodiments of the present disclosure can also be achieved by the process of supplying a program for achieving one or more functions of the above exemplary embodiments to a system or an apparatus via a network or a storage medium, and causing one or more processors of a computer of the system or the apparatus to read and execute the program. Various embodiments of the present disclosure can also be implemented by a circuit (e.g., an ASIC) for achieving the one or more functions.

According to various embodiments of the present disclosure, a communication apparatus that communicates using SOMA communicates information regarding SOMA, whereby a communication apparatus that receives a signal for which SOMA is used can acquire data.

Other Embodiments

Various other embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments of the present disclosure have been described, it is to be understood that the invention is not limited to the disclosed exemplary embodiments. The scope of the following claims is to be accorded the broadest interpretation so as to encompass all such modifications and equivalent structures and functions.

What is claimed is:

1. A communication apparatus comprising:
   at least one memory that stores a set of instructions; and
   at least one processing circuit,
   wherein the communication apparatus is caused, by the at least one processing circuit executing the instructions and/or the at least one processing circuit itself operating, to perform operations comprising:
   determining as to whether a plurality of communication apparatuses support semi-orthogonal multiple access (SOMA) technique or not;
   judging, based on the determination, whether to use the SOMA technique for communicating the radio frame; and
   transmitting a radio frame,
   wherein the radio frame includes a field common to the plurality of communication apparatuses and the field contains first information on whether the SOMA technique is used to communicate the radio frame and the radio frame includes second information indicating whether it is required to perform a Successive Interference Cancellation (SIC) process.

2. The communication apparatus according to claim 1, wherein
the second information is included in each of respective individual fields provided for the plurality of communication apparatuses.

3. The communication apparatus according to claim 1, wherein the second information is included in the radio frame in a case where the SOMA technique is used for communication that is carried out by the communication apparatus.

4. The communication apparatus according to claim 1, wherein each of the individual fields further includes a parameter regarding the SOMA technique used to communicate the radio frame.

5. The communication apparatus according to claim 4, wherein the parameter regarding SOMA technique includes at least one of information indicating a destination of data, information indicating a modulation method and a coding rate of the data, information regarding transmission power of the data.

6. The communication apparatus according to claim 1, wherein the radio frame is compliant with the Institute of Electrical and Electronics Engineers (IEEE) 802.11 series standards.

7. The communication apparatus according to claim 1, wherein the communication apparatus is further caused, by the at least one processing circuit executing the instructions and/or the at least one processing circuit itself operating, to perform operations comprising:
generating the radio frame.

8. A method of a communication apparatus, the method comprising:
determining as to whether a plurality of communication apparatuses support semi-orthogonal multiple access (SOMA) technique or not;
judging, based on the determination, whether to use the SOMA technique for communicating the radio frame; and
transmitting or receiving a radio frame,
wherein the radio frame includes a field common to the plurality of communication apparatuses and the field contains first information on whether the SOMA technique is used to communicate the radio frame and the radio frame includes second information indicating whether it is required to perform a Successive Interference Cancellation (SIC) process.

9. A non-transitory computer-readable storage medium storing a computer program for causing a computer to execute a control method of a communication apparatus, the control method comprising:
determining as to whether a plurality of communication apparatuses support semi-orthogonal multiple access (SOMA) technique or not;
judging, based on the determination, whether to use the SOMA technique for communicating the radio frame; and
transmitting or receiving a radio frame,
wherein the radio frame includes a field common to the plurality of communication apparatuses and the field contains first information on whether the SOMA technique is used to communicate the radio frame and the radio frame includes second information indicating whether it is required to perform a Successive Interference Cancellation (SIC) process.

* * * * *